(12) United States Patent
Ferguson et al.

(10) Patent No.: US 9,063,548 B1
(45) Date of Patent: Jun. 23, 2015

(54) USE OF PREVIOUS DETECTIONS FOR LANE MARKER DETECTION

(71) Applicant: Google Inc., Mountain View, CA (US)

(72) Inventors: David Ian Ferguson, San Francisco, CA (US); Turgay Senlet, Piscataway, NJ (US)

(73) Assignee: Google Inc., Mountain View, CA (US)

( * ) Notice: Subject to any disclaimer, the term of this patent is extended or adjusted under 35 U.S.C. 154(b) by 126 days.

(21) Appl. No.: 13/719,279

(22) Filed: Dec. 19, 2012

(51) Int. Cl.
*B60W 40/00* (2006.01)
*G05D 1/02* (2006.01)

(52) U.S. Cl.
CPC ..................................... *G05D 1/0231* (2013.01)

(58) Field of Classification Search
None
See application file for complete search history.

(56) References Cited

U.S. PATENT DOCUMENTS

| | | | |
|---|---|---|---|
| 4,970,653 A | 11/1990 | Kenue | |
| 5,245,422 A * | 9/1993 | Borcherts et al. | 701/28 |
| 5,307,419 A | 4/1994 | Tsujino et al. | |
| 5,410,346 A | 4/1995 | Saneyoshi et al. | |
| 5,572,428 A | 11/1996 | Ishida et al. | |
| 5,790,403 A * | 8/1998 | Nakayama | 701/28 |
| 6,327,536 B1 | 12/2001 | Tsuji et al. | |
| 6,546,118 B1 | 4/2003 | Iisaka et al. | |
| 6,820,006 B2 | 11/2004 | Patera | |
| 6,859,731 B2 | 2/2005 | Takafuji et al. | |
| 6,930,593 B2 | 8/2005 | Crawshaw | |
| 7,167,799 B1 | 1/2007 | Dolgov et al. | |
| 7,184,073 B2 | 2/2007 | Varadarajan et al. | |
| 7,363,151 B2 | 4/2008 | Nomura et al. | |
| 8,184,859 B2 | 5/2012 | Tanji | |
| 8,269,652 B2 | 9/2012 | Seder et al. | |
| 8,284,995 B2 | 10/2012 | Diaz et al. | |
| 8,473,144 B1 | 6/2013 | Dolgov et al. | |
| 2002/0183929 A1 | 12/2002 | Tsuji et al. | |
| 2003/0060969 A1 | 3/2003 | Waite et al. | |
| 2006/0206243 A1 | 9/2006 | Pawlicki et al. | |
| 2006/0220912 A1 * | 10/2006 | Heenan et al. | 340/933 |
| 2007/0069874 A1 | 3/2007 | Huang et al. | |
| 2007/0203617 A1 | 8/2007 | Haug | |
| 2007/0210953 A1 | 9/2007 | Abraham et al. | |
| 2008/0162027 A1 | 7/2008 | Murphy et al. | |

(Continued)

OTHER PUBLICATIONS

Joel C. McCall and Mohan M. Trivedi, "Video-Based Lane Estimation and Tracking for Driver Assistance: Survey, System, and Evaluation," IEEE Transactions on Intelligent Transportation Systems, vol. 7, No. 1, Mar. 2006.

(Continued)

*Primary Examiner* — John R Olszewski
*Assistant Examiner* — Jess Whittington
(74) *Attorney, Agent, or Firm* — McDonnell Boehnen Hulbert & Berghoff LLP (57) ABSTRACT

Methods and systems for use of previous detections to improve lane marker detection are described. A computing device may be configured to receive lane information generated at previous time periods, and relates to detection of a lane boundary on a road of travel of a vehicle. The computing device may be configured to estimate, based on the lane information, a projection of a respective lane boundary ahead of the vehicle on the road. The computing device may further be configured to determine, based on a speed of the vehicle and geometry of the road, a level of confidence for the projection of the respective lane boundary. The computing device may also be configured to provide instructions to control the vehicle based on the projection and the level of confidence.

22 Claims, 6 Drawing Sheets

(56) References Cited

U.S. PATENT DOCUMENTS

| | | |
|---|---|---|
| 2008/0262721 A1 | 10/2008 | Guo et al. |
| 2009/0030613 A1* | 1/2009 | Kataoka et al. ............... 701/300 |
| 2009/0048750 A1 | 2/2009 | Breed |
| 2009/0055095 A1 | 2/2009 | Urban et al. |
| 2009/0067675 A1 | 3/2009 | Tan et al. |
| 2009/0102630 A1 | 4/2009 | Nordlund |
| 2009/0164080 A1 | 6/2009 | Kurata et al. |
| 2009/0299573 A1 | 12/2009 | Thrun et al. |
| 2009/0306881 A1 | 12/2009 | Dolgov et al. |
| 2010/0034422 A1 | 2/2010 | James et al. |
| 2010/0079590 A1 | 4/2010 | Kuehnle et al. |
| 2010/0082195 A1 | 4/2010 | Lee et al. |
| 2010/0100268 A1* | 4/2010 | Zhang et al. .................... 701/25 |
| 2010/0104199 A1 | 4/2010 | Zhang et al. |
| 2010/0106356 A1 | 4/2010 | Trepagnier et al. |
| 2010/0114416 A1 | 5/2010 | Au et al. |
| 2010/0145552 A1 | 6/2010 | Herman et al. |
| 2010/0148948 A1 | 6/2010 | Murphy et al. |
| 2010/0168965 A1 | 7/2010 | Doerr et al. |
| 2010/0228420 A1 | 9/2010 | Lee |
| 2010/0246889 A1 | 9/2010 | Nara et al. |
| 2010/0256836 A1* | 10/2010 | Mudalige ........................ 701/2 |
| 2010/0274430 A1 | 10/2010 | Dolgov et al. |
| 2010/0295668 A1 | 11/2010 | Kataoka |
| 2010/0332050 A1 | 12/2010 | Kobayashi |
| 2011/0060524 A1 | 3/2011 | Miyajima et al. |
| 2011/0169958 A1 | 7/2011 | Imai et al. |
| 2011/0184605 A1 | 7/2011 | Neff |
| 2011/0200258 A1 | 8/2011 | Suzuki et al. |
| 2011/0301813 A1 | 12/2011 | Sun et al. |
| 2012/0022739 A1 | 1/2012 | Zeng |
| 2012/0057757 A1 | 3/2012 | Oyama |
| 2012/0062747 A1 | 3/2012 | Zeng |
| 2012/0081234 A1 | 4/2012 | Shaffer et al. |
| 2012/0083947 A1* | 4/2012 | Anderson et al. ................. 701/3 |
| 2012/0083960 A1 | 4/2012 | Zhu et al. |
| 2012/0150437 A1* | 6/2012 | Zeng et al. .................... 701/456 |
| 2012/0264376 A1 | 10/2012 | Breed |
| 2012/0283895 A1 | 11/2012 | Noda |
| 2012/0290146 A1* | 11/2012 | Dedes et al. ..................... 701/1 |
| 2012/0314070 A1* | 12/2012 | Zhang et al. ................... 348/148 |
| 2012/0323473 A1 | 12/2012 | Irie et al. |
| 2013/0006478 A1 | 1/2013 | Lin |
| 2013/0079990 A1* | 3/2013 | Fritsch et al. ................... 701/41 |

OTHER PUBLICATIONS

Wei Li et al., "Recognizing white line markings for vision-guided vehicle navigation by fuzzy reasoning," Pattern Recognition Letters vol. 18, Issue 9, pp. 771-780, Aug. 1997.

* cited by examiner

USE OF PREVIOUS DETECTIONS FOR LANE MARKER DETECTION

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present disclosure discloses embodiments that relate to use of previous detections for lane marker detection. In one aspect, the present disclosure describes a method. The method may comprise receiving, at a computing device, lane information generated at one or more previous time periods, and relating to detection of a lane boundary on a road of travel of a vehicle. The method also may comprise estimating, based on the lane information, a projection of a respective lane boundary ahead of the vehicle on the road. The method further may comprise determining, based on a speed of the vehicle and geometry of the road, a level of confidence for the projection of the respective lane boundary. The method also may comprise providing instructions to control, using the computing device, the vehicle based on the projection and the level of confidence.

In another aspect, the present disclosure describes a non-transitory computer readable medium having stored thereon executable instructions that, upon execution by a computing device, cause the computing device to perform functions. The functions may comprise receiving lane information generated at one or more previous time periods, and relating to detection of a lane boundary on a road of travel of a vehicle. The functions also may comprise estimating, based on the lane information, a projection of a respective lane boundary ahead of the vehicle on the road. The functions further may comprise receiving vehicle information indicative of a speed of the vehicle. The functions also may comprise receiving road information indicative of geometry of the road. The functions further may comprise determining, based on the vehicle information and the road information, a level of confidence for the projection of the respective lane boundary. The functions also may comprise providing instructions to control the vehicle based on the projection and the level of confidence.

In still another aspect, the present disclosure describes a control system. The control system may comprise at least one processor. The control system also may comprise a memory having stored thereon executable instructions that, upon execution by the at least one processor, cause the control system to perform functions comprising receiving lane information generated at one or more previous time periods, and relating to detection of a lane boundary on a road of travel of a vehicle. The functions may also comprise estimating, based on the lane information, a projection of the respective lane boundary ahead of the vehicle on the road. The functions further may comprise receiving vehicle information indicative of a speed of the vehicle. The functions may also comprise receiving road information indicative of geometry of the road. The functions further may comprise determining, based on the vehicle information and the road information, a level of confidence for the projection of the respective lane boundary. The functions also may comprise providing instructions to control the vehicle based on the projection and the level of confidence.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on identifying lane boundaries for navigation. A computing device, configured to control the vehicle, may also be configured to have access to map information that may indicate the lane boundaries on the road. However, in some examples, the map information may include inaccuracies in estimation of the lane boundaries or may not be updated with road changes (e.g., construction zones, etc.). Also, lane marker detection systems may have challenges estimating the lane boundaries, such as having false positives occurring due to objects or shadows on the road that may exhibit characteristics similar to lane markers.

In an example, to estimate a lane boundary, the computing device may be configured to use lane information generated at previous time periods to estimate a projection of the lane boundary ahead of the vehicle. The lane information may include, for example, one or more of map information, position tracking information of one or more vehicles on the road, and an image depicting a lane marker. For instance, the computing device may be configured to use frames or images captured at previous time periods to project the lane boundary ahead of the vehicle. As an example for illustration, if the previous images depict a lane boundary as a straight line, the computing device may be configured to project the lane boundary as a straight line ahead of the vehicle.

Further, the computing device may be configured to receive respective lane information at a present time period, and modify the estimated projection of the lane boundary based on the respective lane information. For instance, the respective lane information may include an image captured at a present time period by a camera coupled to the vehicle. The previously captured lane information may indicate that the lane boundary may extend as a straight line, while the respective lane information captured at the present time period may show that the lane boundary is curving along with the road, for example. In this example, the computing device may be configured to modify the estimated projection to reflect the curvature detected.

In examples, the computing device may estimate the lane boundary projection probabilistically. For instance, a probability of estimation of the lane boundary on a given portion of the road may be inversely proportional to the distance between the vehicle and the given portion of the road. The computing device may thus be configured to determine or assign a level of confidence to the estimation of the lane boundary projection based on the probability of estimation. In some examples, the level of confidence may be based on road geometry and characteristics of the vehicle. For instance, the level of confidence may decrease as a speed of the vehicle increases because estimations based on previously obtained information may be less accurate when the speed of the vehicle is high. Also, if orientation or lateral position of the vehicle relative to the road is different from a corresponding orientation or lateral position from which a previous image, on which the projection is based, was captured, the level of confidence may be decreased.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Figure 1:
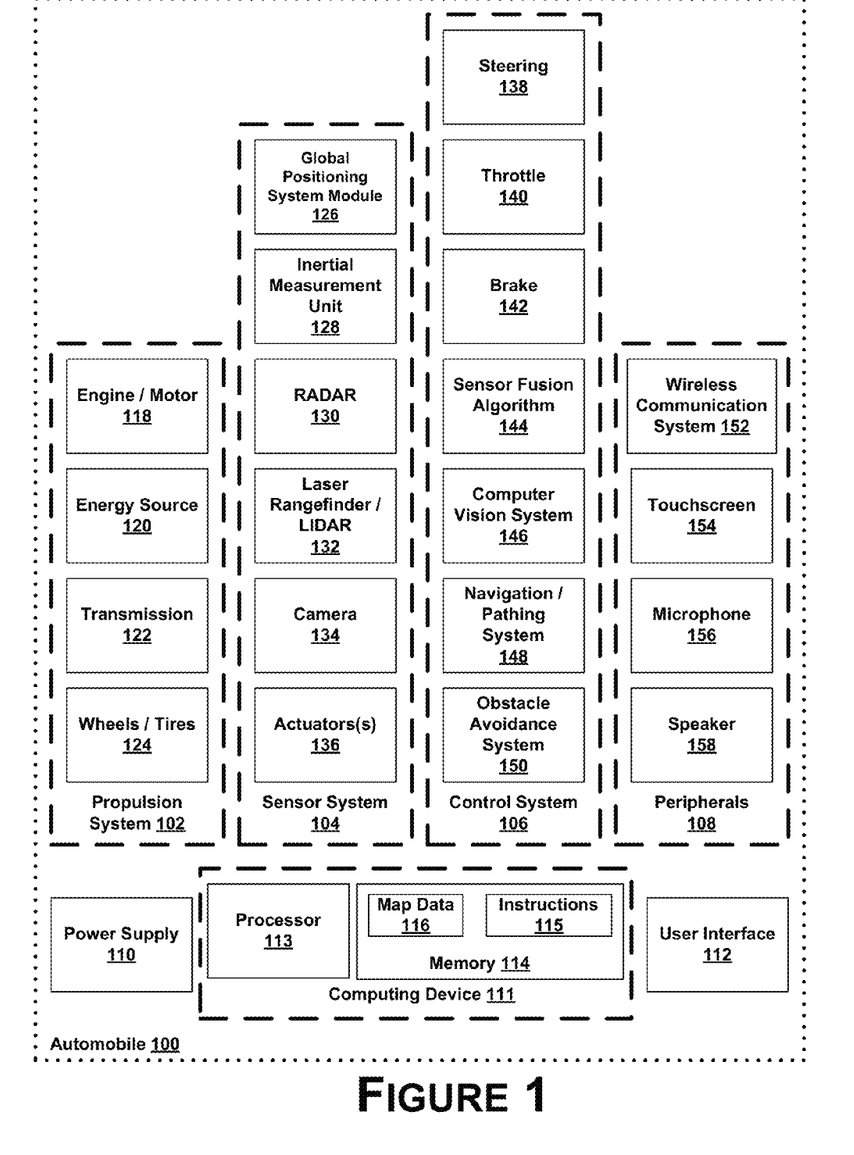
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
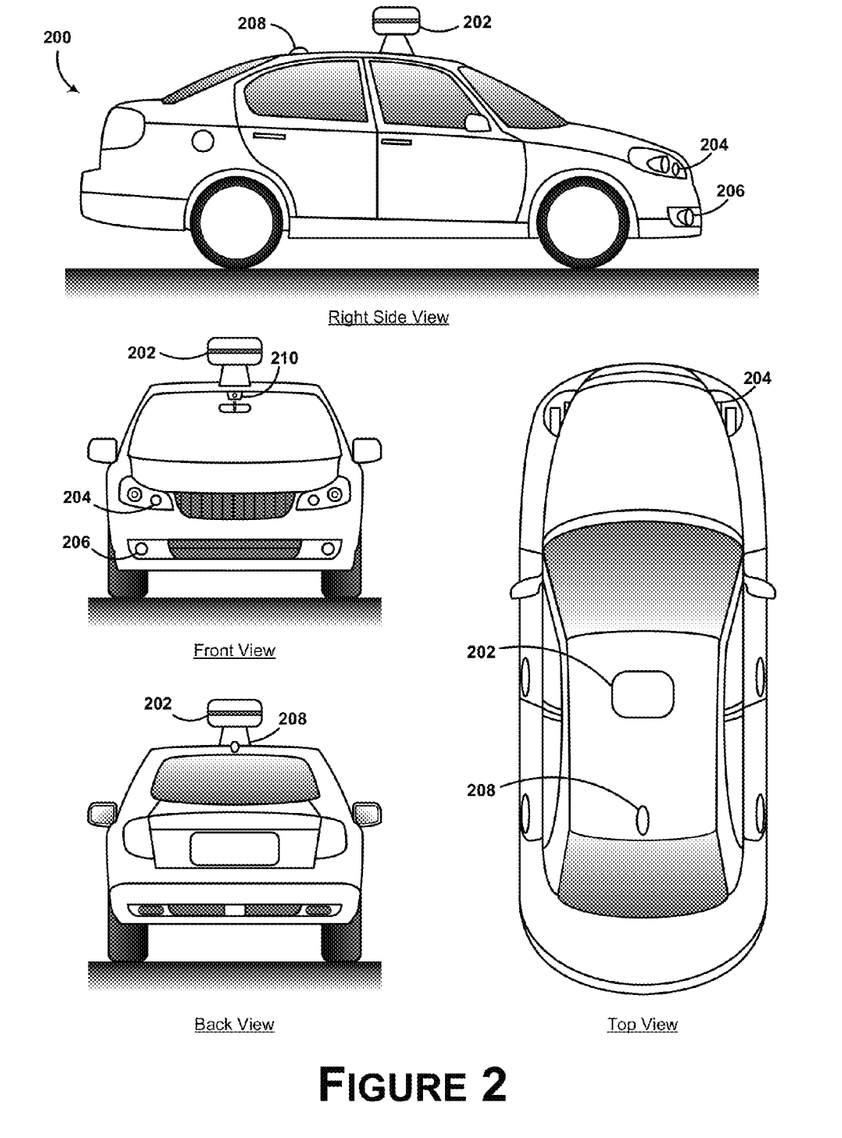
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
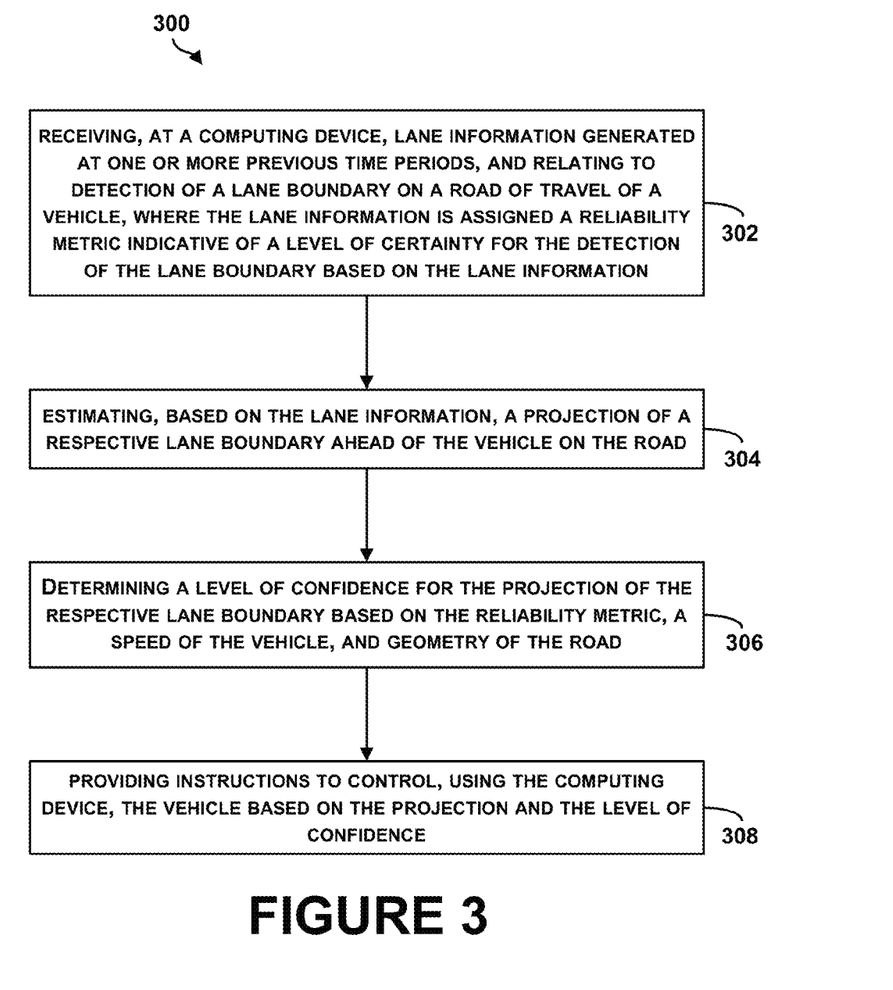
FIG. 3 is a flow chart of a method for use of previous detections for lane marker detection, in accordance with an example embodiment.

FIG. 3 is a flow chart of a method 300 for use of previous detections to improve lane marker detection, in accordance with an example embodiment. The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. In addition, for the method 300 and other processes and methods disclosed herein, each block in FIG. 3 may represent circuitry that is wired to perform the specific logical functions in the process.

At block 302, the method 300 includes receiving, at a computing device, lane information generated at one or more previous time periods, and relating to detection of a lane boundary on a road of travel of a vehicle, where the lane information is assigned a reliability metric indicative of a level of certainty for the detection of the lane boundary based on the lane information. A controller or a computing device, such as the computing device 111 in FIG. 1, may be onboard the vehicle or may be off-board but in wireless communication with the vehicle, for example. The computing device may be configured to control the vehicle in an autonomous or semi-autonomous operation mode. Further, the computing device may be configured to receive, from sensors and devices coupled to the vehicle, information associated with, for example, condition of systems and subsystems of the vehicle, driving conditions, road conditions, etc.

The lane information received at the computing device may comprise one or more information types. For example, the lane information may comprise map information generated or determined at previous time periods, associated with a number of lanes, locations of lane boundaries, etc. The map information may not include information relating to recent changes to road structure or temporary road work that may cause changes to road lanes (e.g., number of lanes or the locations of lane boundaries may change).

In another example, the lane information may include position tracking information of other vehicles on the road. Tracking positions and trajectories of other vehicles on the road may provide information relating to the locations of lane boundaries on the road. In one example, the lane information may comprise information associated with locations of static objects with respect to the road (e.g., curbs, shoulders, etc.) and the information may be used to infer road structure, the locations of lane boundaries, etc. The tracking information may have been captured at previous time periods while the vehicle is driven on the road.

In still another example, the lane information may comprise images of the road depicting lane markers. A camera, such as the camera 134 in FIG. 1 or the camera 210 in FIG. 2 or any other image-capture device, may be coupled to the vehicle and may be in communication with the computing device. The camera may be configured to capture images or a video of the road and vicinity of the road. The computing device may be configured to receive the images or video and identify, using image processing techniques for example, objects depicted in the image or the video. The computing device may be configured to compare portions of the images to templates of objects to identify the objects, for example. Examples of objects may include moving or static objects, traffic signs, obstacles on the road, pedestrians, lane markers, etc. Herein, "lane markers" may include painted solid or dashed white or yellow lines, raised pavement markers referred to as Botts' dots, retroreflective safety devices used in road marking and referred to as Cat's Eyes, or any other type of lane markers that define lane boundaries on the road.

In another example, in addition to or alternative to receiving images captured by a camera, the computing device may be configured to receive, from a LIDAR device (e.g., the LIDAR unit 132 in FIG. 1) coupled to the vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the vehicle in three dimensions. In some examples, more than one LIDAR device may be coupled to the vehicle to scan a complete 360° horizon of the vehicle. The LIDAR device may be configured to provide to the computing device a cloud of point data representing objects (e.g., lane markers), which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the vehicle. Additionally, the LIDAR device may be configured to provide to the computing device intensity values of the light or laser reflected off a given object that may be indicative of a surface type of the given object. Based on such information, the computing device may be configured to identify the objects such as lane markers. LIDAR device points representing lane markers, for example, may be characterized by high intensity values relative to neighboring points that represent non-marked portions of the road.

The images or the 3D point cloud images may be captured at previous time periods. For example, the camera coupled to the vehicle may have captured the images before a present time period while the vehicle is driven on the road. The camera may be configured to continuously capturing images of the road at a certain number of frames per second, for example, and the computing device may be configured to have access to frames previously captured. In another example, the images may be reference images captured at previous time periods by other vehicles.

In examples, to identify lane markers in images captured at a previous time period, the computing device may be configured to select an image depicting the closest lane markers to the vehicle (e.g., directly behind the vehicle). Selecting such image may ensure a higher accuracy or lower uncertainty in projecting or predicting lane boundaries ahead of the vehicle.

In one example, in order to facilitate detection or identification of lane boundaries in the image, the computing device may be configured to generate a top view image corresponding to an image captured by the camera. By generating the top view image, perspective effect in the image can be removed, and thus lanes that appear to converge at the horizon line may become substantially parallel. In this manner, identification of lane boundaries may be facilitated and accuracy may be improved. Several methods can be used to transform an image into a corresponding top view image. The top view image may be generated by transforming the image such that a planar object such as the road can be observed from a direction perpendicular to a surface of the road.

In examples, to generate top view images, a calibration procedure may be performed for the camera. To calibrate the camera, an image may be captured and a corresponding top view image may also be captured. Sets of pixels may be identified in the image and corresponding sets of points may be identified in the top view image. The calibration procedure may also include obtaining camera parameters such as focal length, pixel size, mounting location and angle, etc. The camera parameters may be used to generate a homography matrix (e.g., a 3×3 planar projective transformation matrix) that can be applied to the sets of pixels to generate the corresponding sets of pixels, for example. The homography matrix may be stored in the computing device configured to control the vehicle.

The computing device may be configured to apply the matrix to images captured by the camera to generate corresponding top view images. In some examples, the computing device may be configured to modify the matrix to adapt to changes in conditions or changes to camera parameters, etc.

Additionally, the lane information may be assigned a reliability metric. The reliability metric may include a measure of quality of the lane information, and may be indicative of a level of certainty for the detection of the lane boundary based on the lane information. For example, if the lane information includes images of the road depicting lane markers, the reliability metric may indicate how many pixels that may represent lane marker are detected in the images. In examples, the reliability metric may be indicative of a level of certainty in determining the lane markers based on the detected pixels. For instance, the reliability metric may be based on how bright the pixels are relative to other portions of the road that are unmarked (e.g., asphalt or other portions of the road that does not include lane markers). In an example, if the lane information includes map information, the reliability metric may be based on how recently the map information has been updated. Other methods for determining the reliability metric, based on the lane information and the type of lane information, are possible. The methods described herein are examples for illustration and are not limiting.

Figure 4A:
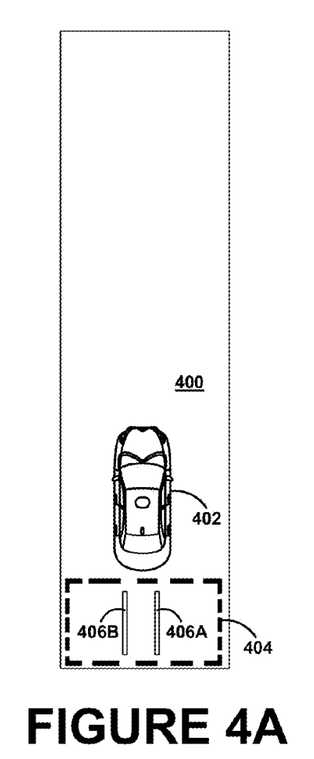
FIG. 4A illustrates an example road of travel of a vehicle and a conceptual image frame captured at a previous time period, in accordance with an example embodiment.

FIG. 4A illustrates an example road 400 of travel of a vehicle 402 and a conceptual image frame 404 captured at a previous time period, in accordance with an example embodiment. FIG. 4A depicts the vehicle 402 already passed lane markers 406A and 406B that define lane boundaries on the road. A camera coupled to the vehicle 402 may have captured the frame 404 including content depicting the lane markers 406A and 406B at a time period prior to a present time period with respect to the vehicle 402. The frame 404 may thus represent lane information received at a previous time period, and the lane information can be used to predict the lane boundaries ahead of the vehicle.

Referring back to FIG. 3, at block 304, the method 300 includes estimating, based on the lane information, a projection of a respective lane boundary ahead of the vehicle on the road. For instance, the computing device may be configured to use frames or images captured at previous time periods to project a lane boundary ahead of the vehicle. As an example for illustration, if the previous images depict a lane boundary as a straight line, the computing device may be configured to project the lane boundary as a straight line ahead of the vehicle. In another example, the previous image or frame may depict a lane boundary that is curving with the road, and the computing device may be configured to estimate or fit a curve to the lane markers depicted in the previous image to project (i.e., forecast or predict) the lane boundary ahead of the vehicle. For example, referring to FIG. 4A, the computing device configured to control the vehicle 402 may be configured to project lane boundaries ahead of the vehicle 402 based on the lane markers 406A and 406B depicted in the frame 404.

Figure 4B:
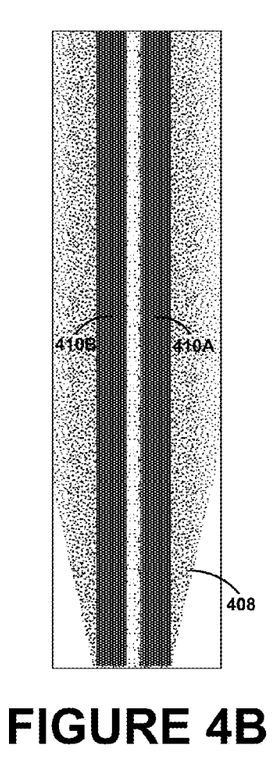
FIG. 4B illustrates an estimation of lane boundaries, in accordance with an example embodiment.

FIG. 4B illustrates an estimation of lane boundaries, in accordance with an example embodiment. The computing device, for example, may be configured to estimate a conceptual projection region 408 ahead of the vehicle 402 that may include the lane boundaries. Also, the computing device may be configured to estimate high probability strips 410A and 410B, depicted as darker grey strips in FIG. 4B, in the projection region 408. The high probability strips 410A and 410B may represent portions of the road 400 that have a higher probability of including the lane boundaries (e.g., lane markers) than other portions of the projection region 408.

Referring back to FIG. 3, at block 306, the method 300 includes determining a level of confidence for the projection of the respective lane boundary based on the reliability metric, a speed of the vehicle, and geometry of the road. The computing device may be configured to receive, e.g., from one or more sensors coupled to the vehicle, information indicative of characteristics of the vehicle such as speed, steering angle or direction of travel, relative position of the vehicle with respect to the road, etc. Also, the computing device may be configured to receive road information indicative of road geometry. For example, images captured by a camera or a LIDAR device coupled to the vehicle may be indicative of road geometry ahead of the vehicle, e.g., curvature of the road, width of the road, number of lanes on the road, etc.

The vehicle characteristics and road geometry may affect estimation of the projection of the lane boundary ahead of the vehicle. In one example, to take the vehicle characteristics and the road geometry into account, the computing device may be configured to assign or determine, based on the vehicle characteristics and the road geometry, a level of confidence for the estimated projection of the lane boundaries. The level of confidence may, for example, be indicative of reliability of the estimation.

For instance, uncertainty in estimation of the projection of the lane boundaries ahead of the vehicle may be increased proportionally with respect to the speed of the vehicle since the observations that are made in the previous frame are less reliable when the vehicle is going faster and covering more distance between each frame. Thus, the computing device may be configured to assign or determine the level of confidence based on the speed of the vehicle.

In another example, the lane information may include reference images captured by another vehicle at previous periods of time. In this example, a pose (e.g., a combination of position and orientation of a given vehicle relative to the road) of the other vehicle may be different from a respective pose of the vehicle controlled by the computing device. Thus, the computing device may be configured to take the difference in pose into account when estimating the projection of the lane boundary. As an example, for illustration, the computing device may be configured to determine a transform that, when applied to pixels of a reference image, may cause the image to shift and/or rotate, and thus cause the image to correspond to a pose of the vehicle controlled by the computing device. The computing device may, for example, be configured to determine a level of confidence based on the transform and thus account for the effect of the difference in pose on the estimation.

In another example, the computing device may be configured to determine the level of confidence based on road geometry (e.g., curvature). For example, the previously captured lane information may indicate that the lane boundary might be a straight line, while the computing device may receive road information that the road might be curving ahead. In this example, the computing device may be configured to assign a low level of confidence for the estimated straight line projection. Thus, in instances in which the road information does not match captured information or projections, low confidence levels may be assigned. The confidence levels may thus be based on received information matching stored information or other projections.

In still another example, the computing device may be configured to determine the level of confidence for a respective portion of the lane boundary ahead of the vehicle at a respective portion of the road based on a distance between the vehicle and the respective portion of the road. As the distance increases, the level of confidence may be decreased proportionally (e.g., uncertainty in the estimated projection of the lane boundary is increased).

In examples, the computing device may be configured to determine a probabilistic distribution for the estimated projection of lane boundaries ahead of the vehicle. As the vehicle moves, the computing device may be configured to modify the probabilistic distribution longitudinally ahead of the vehicle. The modification may, for example, be based on new lane information received, the characteristics of the vehicle, and the road geometry. The level of confidence may be determined based on the probabilistic distribution.

In an example, as the distance between the vehicle and a location on the road corresponding to where given lane information was previously captured increases, the effect or influence of the given lane information on the estimation decreases. Thus, the level of confidence for the estimation based on the given lane information decreases (i.e., uncertainty in the estimated projection of the lane boundary based on the given lane information increases).

The level of confidence may also be based on the reliability metric assigned to the lane information generated at the one or more previous time periods. As described at block 302 of the method 300, the reliability metric may be indicative of a level of certainty for the detection of the lane boundary based on the lane information. For example, the level of confidence may be proportional to the reliability metric. A high reliability metric may indicate a high level of certainty in the detection of the lane boundary and thus a high level of confidence may be assigned to the estimated projection of the respective lane boundary.

The level of confidence could be expressed qualitatively, such as a "low," "medium," or "high" level of confidence. Alternatively, the level of confidence could be expressed quantitatively, such as a number on a scale. Other examples are possible.

In examples, the computing device may be configured to receive lane information at a present time period and modify the estimated projection of the lane boundary accordingly. For example, the computing device may be configured to receive a respective image captured at a present time and modify the estimated projection of the lane boundary ahead of the vehicle based on the respective image.

Figure 4C:
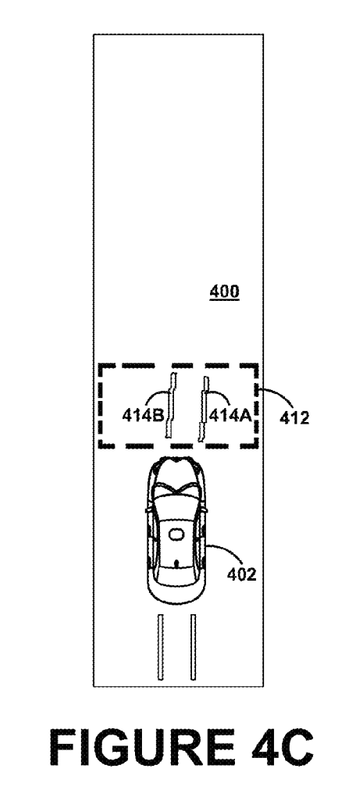
FIG. 4C illustrates the example road of travel of the vehicle and an area including image frame captured at a present time period, in accordance with an example embodiment.

FIG. 4C illustrates the example road 400 of travel of the vehicle 402 and an area including an image or frame 412 captured at a present time period, in accordance with an example embodiment. The camera coupled to the vehicle 402 may be configured to capture, at a present time period, the image or frame 412 that depicts lane markers 414A and 414B. The computing device may be configured to modify the estimated projection of lane boundaries depicted in FIG. 4B based on the frame 412.

Figure 4D:
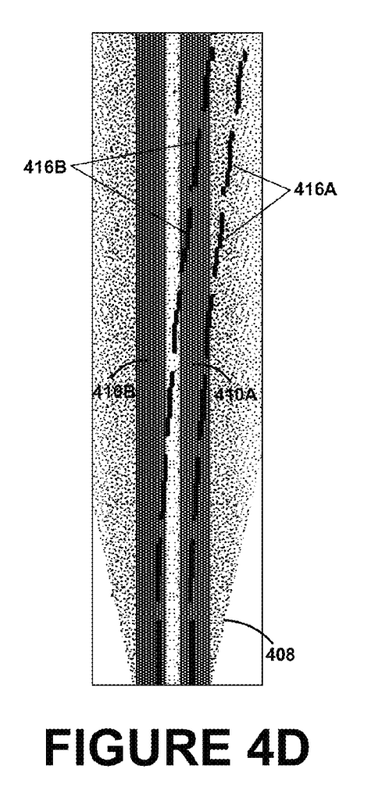
FIG. 4D illustrates a modified estimation of the lane boundaries superimposed on a prior estimation of lane boundaries, in accordance with an example embodiment.

FIG. 4D illustrates a modified estimation of lane boundaries superimposed on the prior estimation of lane boundaries, in accordance with an example embodiment. The prior estimation is illustrated by the high probability strips (dark grey strips) 410A and 410B. The computing device, for example, may be configured to estimate a modified projection of the lane boundaries represented by lane markers 416A and 416B based on the image 412. In addition to modifying the estimated projection, the computing device may be configured to modify the level of confidence or the probabilistic distribution associated with the estimation based on the lane information received at the present time period.

Figure 4E:
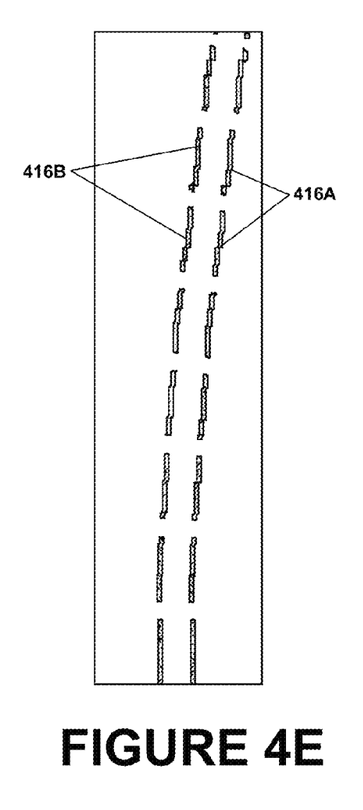
FIG. 4E illustrates the modified estimation of the lane boundaries, in accordance with an example embodiment.

FIG. 4E illustrates the modified estimation of the lane boundaries, in accordance with an example embodiment. In FIG. 4E, the prior estimation is suppressed and only the modified estimation is shown. The estimated modified projection of the lane boundaries represented by lane markers 416A and 416B represents a high probability estimate of the lane boundaries at the present time period. It should be noted that, in examples, as the vehicle 402 passes the lane markers 414A and 414B and reach a new location on the road 400, the image 412 may then represent lane information captured at a previous time period with respect to the vehicle 402 at the new location. The computing device may be configured to estimate a respective projection of the lane boundaries, and an associated respective probability distribution, ahead of the vehicle with respect to the new location of the vehicle 402.

Referring back to FIG. 3, at block 308, the method 300 includes providing instructions to control, using the computing device, the vehicle based on the projection and the level of confidence. The control system of the vehicle may support multiple control strategies and associated driving behaviors that may be predetermined or adaptive to changes in a driving environment of the vehicle. Generally, a control strategy may comprise sets of rules associated with traffic interaction in various driving contexts. The control strategy may comprise rules that determine a speed of the vehicle and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, based on the estimated projection of the lane boundaries and the level of confidence, the computing device may be configured to select a control strategy comprising rules for actions that control the vehicle such that the vehicle adheres to the estimated lane boundaries.

In an example, a given control strategy may comprise a program or computer instructions that characterize actuators controlling the vehicle (e.g., throttle, steering gear, brake, accelerator, or transmission shifter) based on the level of confidence and the estimated lane boundaries. The given control strategy may include action sets ranked by priority, and the action sets may include alternative actions that the vehicle may be configured to take to accomplish a task (e.g., driving from one location to another). The alternative actions may be ranked based on the level of confidence and the estimated lane boundaries, for example.

In another example, multiple control strategies (e.g., programs) may continuously propose actions to the computing device. The computing device may be configured to decide which strategy may be selected based on a weighted set of goals (e.g., safety, speed, adhering to the estimated lane boundaries, etc.), for example. Based on an evaluation of the weighted set of goals, the computing device, for example, may be configured to rank the multiple control strategies and respective action sets and determine a given control strategy and a respective action set based on the ranking.

As an example, providing instructions to control the vehicle may comprise determining a desired path of the vehicle, based on the estimated lane boundaries and the level of confidence. In one example, the computing device may determine a high level of confidence (e.g., greater than a threshold level of confidence) for the estimated the lane boundaries. In this example, the computing device may be configured to take into account the estimated lane boundaries as a hard constraint (i.e., the lane boundaries cannot be violated) when determining the desired path. Alternatively, in another example, the computing device may determine a low level of confidence (e.g., less than a threshold level of confidence) for the estimated lane boundaries. In this example, the computing device may be configured to take into account the estimated lane boundaries as a soft constraint (e.g., the lane boundaries can be violated if a safer path is determined) when determining the desired path.

Thus, the computing device may be configured to provide instructions (e.g., instructions that may comprise an action set or rule set) that may be executed to control actuators of the vehicle. For instance, the computing device may be configured to provide program instructions to adjust translational velocity, or rotational velocity, or both, of the vehicle such that the vehicle may adhere to the estimated lane boundaries. In FIG. 4E, for example, the computing device may be configured to provide instructions to control the vehicle such that the vehicle may adhere to the estimated lane boundaries represented by the lane markers 416A and 416B.

These control actions and driving situations are for illustration only. Other actions and situations are possible as well. In one example, the computing device may be configured to control the vehicle based on the modified control strategy as an interim control until a human driver can take control of the vehicle.

Figure 5:
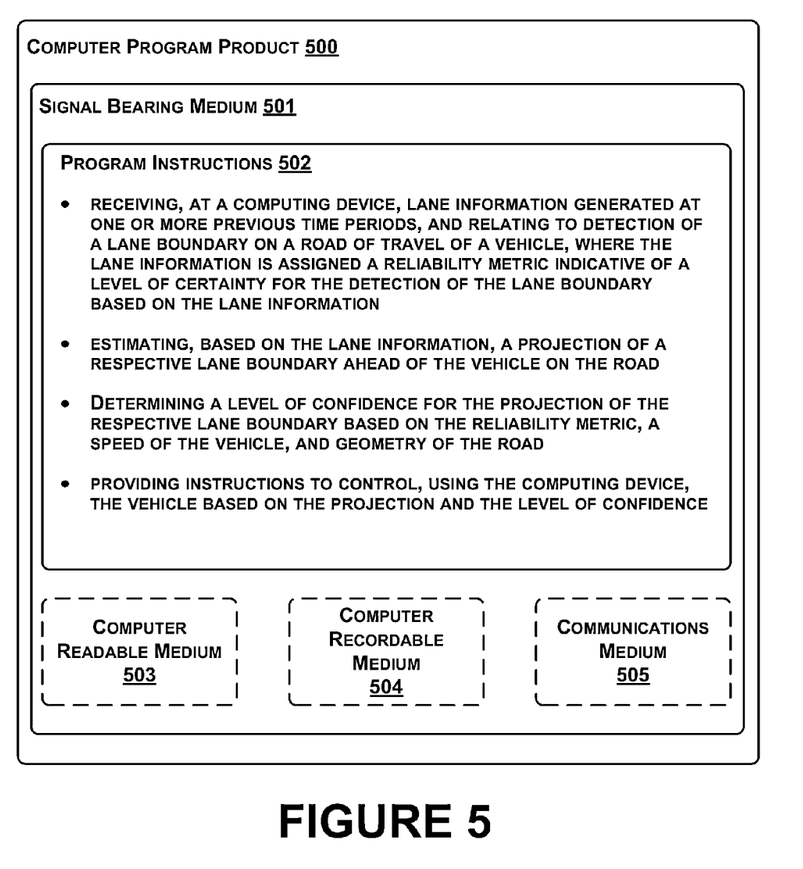
FIG. 5 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4E. Thus, for example, referring to the embodiments shown in FIG. 3, one or more features of blocks 302-308 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4E may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, at a computing device, lane information that relates to detection of a lane boundary at a first portion of a road of travel of a vehicle, and wherein the lane information is assigned a reliability metric indicative of a level of certainty for the detection of the lane boundary at the first portion based on the lane information;
   estimating, by the computing device, based on the lane information, a projection of a respective lane boundary at a second portion of the road ahead of the vehicle, wherein the second portion of the road is farther from the vehicle than the first portion;
   determining, by the computing device, a level of confidence for the projection of the respective lane boundary at the second portion based on the reliability metric, a speed of the vehicle, and geometry of the road, such that the level of confidence decreases as the speed of the vehicle increases; and
   controlling, by the computing device, the vehicle based on the projection and the level of confidence.

2. The method claim 1, wherein determining the level of confidence comprises determining the level of confidence further based on one or more of an orientation of the vehicle and a lateral position of the vehicle relative to the road.

3. The method of claim 1, wherein determining the level of confidence for the projection of the respective lane boundary at the second portion of the road comprises determining the level of confidence based on a distance between the vehicle and the second portion of the road such that the level of confidence decreases as the distance between the vehicle and the second portion of the road increases.

4. The method of claim 1, wherein the lane information comprises one or more of map information, position tracking information of one or more vehicles on the road, an image depicting a lane marker, and road geometry information.

5. The method of claim 1, further comprising:
   receiving respective lane information captured for a given portion of the road between the first portion and the second portion; and
   modifying the estimated projection of the respective lane boundary based on the respective lane information, wherein controlling the vehicle comprises controlling the vehicle based on the modified projection.

6. The method of claim 5, wherein the lane information comprises an image of the first portion of the road, and the respective lane information comprises a respective image of the given portion of the road, wherein the image and the respective image are captured by a camera or a light detection and ranging (LIDAR) device coupled to the vehicle.

7. The method of claim 6, wherein the image is a reference image captured by a respective camera or a respective LIDAR device coupled to another vehicle.

8. The method of claim 5, wherein modifying the estimated projection comprises modifying the level of confidence.

9. The method of claim 1, wherein the computing device is configured to control the vehicle in an autonomous operation mode.

10. A non-transitory computer readable medium having stored thereon executable instructions that, upon execution by a computing device, cause the computing device to perform functions comprising:
   receiving lane information that relates to detection of a lane boundary at a first portion of a road of travel of a vehicle, and wherein the lane information is assigned a reliability metric indicative of a level of certainty for the detection of the lane boundary at the first portion based on the lane information;
   estimating, based on the lane information, a projection of a respective lane boundary at a second portion of the road ahead of the vehicle, wherein the second portion of the road is farther from the vehicle than the first portion;
   receiving vehicle information indicative of a speed of the vehicle;
   receiving road information indicative of geometry of the road;
   determining a level of confidence for the projection of the respective lane boundary at the second portion based on the reliability metric, the vehicle information, and the road information, such that the level of confidence decreases as the speed of the vehicle increases; and
   controlling the vehicle based on the projection and the level of confidence.

11. The non-transitory computer readable medium of claim 10, wherein the vehicle information is further indicative of one or more of an orientation of the vehicle and a lateral position of the vehicle relative to the road.

12. The non-transitory computer readable medium of claim 10, wherein the function of determining the level of confidence for the projection of the respective lane boundary at the second portion of the road comprises:
   determining the level of confidence based on a distance between the vehicle and the second portion of the road such that the level of confidence decreases as the distance between the vehicle and the second portion of the road increases.

13. The non-transitory computer readable medium of claim 10, wherein the functions further comprise:
   receiving respective lane information captured for a given portion of the road between the first portion and the second portion; and
   modifying the estimated projection of the respective lane boundary based on the respective lane information, wherein controlling the vehicle comprises controlling the vehicle based on the modified projection.

14. The non-transitory computer readable medium of claim 13, wherein the lane information comprises an image of the first portion of the road, and the respective lane information comprises a respective image of the given portion of the road, and wherein the image and the respective image are captured by a camera or a light detection and ranging (LIDAR) device coupled to the vehicle.

15. The non-transitory computer readable medium of claim 10, wherein the computing device is configured to control the vehicle in an autonomous operation mode.

16. A control system comprising:
   at least one processor; and
   a memory having stored thereon executable instructions that, upon execution by the at least one processor, cause the control system to perform functions comprising:
      receiving lane information that relates to detection of a lane boundary at a first portion of a road of travel of a vehicle, and wherein the lane information is assigned a reliability metric indicative of a level of certainty for the detection of the lane boundary at the first portion based on the lane information;
      estimating, based on the lane information, a projection of a respective lane boundary at a second portion of the road ahead of the vehicle, wherein the second portion of the road is farther from the vehicle than the first portion;
      receiving vehicle information indicative of a speed of the vehicle;
      receiving road information indicative of geometry of the road;
      determining a level of confidence for the projection of the respective lane boundary at the second portion based on the reliability metric, the vehicle information, and the road information, such that the level of confidence decreases as the speed of the vehicle increases; and
      controlling the vehicle based on the projection and the level of confidence.

17. The control system of claim 16, wherein the vehicle information is further indicative of one or more of an orientation of the vehicle and a lateral position of the vehicle relative to the road.

18. The control system of claim 16, wherein function of determining the level of confidence for the projection of the respective lane boundary at the second portion of the road comprises:
   determining the level of confidence based on a distance between the vehicle and the second portion of the road.

19. The control system of claim 18, wherein the function of determining the level of confidence comprises:
   determining the level of confidence such that the level of confidence decreases as the distance between the vehicle and the second portion of the road increases.

20. The control system of claim 16, wherein the control system is configured to control the vehicle in an autonomous operation mode.

21. The method of claim 1, wherein the vehicle is a first vehicle, wherein the lane information includes an image captured by an image-capture device coupled to a second vehicle, and wherein a pose of the second vehicle is different from a pose of the first vehicle, the method further comprising:
   applying a transform, based on a difference in pose between the first vehicle and the second vehicle, to the image, wherein estimating the projection of the respective lane boundary at the second portion of the road is based on the transformed image.

22. The method of claim 1, wherein the first portion of the road represents a given portion of the road that the vehicle has passed.

* * * * *